Patented July 3, 1951

2,559,166

UNITED STATES PATENT OFFICE 2,559,166

STYRENE COPOLYMERS

Richard R. Morner and David T. Mowry, Dayton, Ohio, assignors to Monsanto Chemical Company, St. Louis, Mo., a corporation of Delaware No Drawing. Application May 26, 1950, Serial No. 164,602

4 Claims. (Cl. 260—79.3)

This invention relates to the production of copolymers of styrene having very desirable chemical and physical properties. More particularly the invention relates to the conjoint polymerization of styrene and thianaphthene-1-dioxide, otherwise known as benzothiophene-1-dioxide.

Polystyrene is a valuable and useful article of commerce, but its industrial applications are limited by certain inherent properties. The thermostability of polystyrene is deficient, and temperatures at or near the boiling point of water will cause serious softening and distortions of the polymers. Tableware and hospital supplies cannot be molded since temperatures of normal washing operations and sterilization temperatures must be avoided.

One purpose of this invention is to provide a new copolymer with substantially better thermostability than polystyrene. A further purpose is to provide a method of modifying polystyrene to improve its inherent deficiencies and at the same time retain all the desirable properties of polystyrene.

In accordance with this invention it has been discovered that styrene can be polymerized with thianaphthene-1-dioxide to form very desirable copolymers. The copolymers may be copolymers of one to 20 per cent of thianaphthene-1-dioxide and from 80 to 99 per cent of styrene. Because the use of a substantial portion of thianaphthene-1-dioxide may induce brittleness in the product and since under some circumstances very small proportions of the comonomers do not improve the heat distortion sufficiently to enable the polymer to withstand boiling temperatures, preferred practice involves the copolymerization of from two to 12 per cent of thianaphthene-1-dioxide and from 88 to 98 per cent of styrene.

The new copolymers may be made by any conventional polymerization procedure, for example mass polymerization, solution polymerization or emulsion polymerization. The polymerizations are conducted in the presence of a peroxy compound which is soluble in the polymerization medium. The polymerizations usually require elevated temperatures, for example from 50 to 200° C. depending upon the technique of polymerization to be used.

The mass polymerizations are generally conducted in the presence of catalysts, such as benzoyl peroxide, acetyl peroxide and isopropyl percarbonate or other compounds containing a peroxy linkage (—O—O—), and which is soluble in the monomer. Polymerization under these conditions is generally initiated at a low temperature, which is then gradually or periodically increased during the polymerization. The period of reaction will depend upon the temperature schedule and may vary from a few hours to one hundred or more hours.

Solution polymerizations are usually conducted in the manner described above for mass polymerizations except that the solvent acts as a diluent and may require higher temperatures, more catalyst and/or longer reaction periods.

A preferred method for preparing the new copolymers involves the copolymerization in an aqueous suspension. This method utilizes water-soluble compounds containing the peroxide linkage, for example hydrogen peroxide, sodium percarbonate, sodium persulfate, sodium perborate, or other alkali metal salt of the same and other peroxy acids. Generally polymerizations involving this technique utilize temperatures from 50 to the boiling point of the reaction mixture. In the practice of this invention by the emulsion procedure, it is generally desirable to use emulsifying agents to prevent the agglomeration of the polymers and to maintain a fluid reaction medium. Suitable emulsifying agents or dispersing agents are the rosin soaps, salts of sulfonated alkylbenzenes, triethanolamine, water-soluble salts of high molecular weight fatty acids and mixtures of the same as obtained by the saponification of animal and vegetable oils, and other compounds containing both hydrophobic and hydrophilic radicals which will stabilize the emulsion or suspension.

The emulsion polymerization reaction is preferably conducted by charging the monomer to an aqueous medium maintained under polymerization conditions by heating in the presence of the peroxy catalyst or a diazo catalyst, such as $\alpha,\alpha'$-azodiisobutyronitrile, and the emulsifying agent. The monomers may be charged entirely before the reaction is initiated, but preferred practice involves the mixed monomer procedure with gradual addition throughout the reaction. Such procedure may be continuous whereby the polymer is continuously withdrawn through the reaction, or it may be semi-continuous where the polymer accumulates in the reactor and is withdrawn when a pre-determined quantity of monomer has been added to the reaction vessel.

The polymer emulsion, whether withdrawn continuously or at the end of the preparation, may then be separated into solid and aqueous phases by the addition of a coagulant, such as aluminum sulfate, sulfuric acid, or ethyl alcohol, by freezing the emulsion or in some cases merely by the filtration of the latex.

The new copolymers are useful as molding compositions and by this procedure may be fabricated into a wide variety of useful articles.

Further details of the preparation of the new copolymers are set forth with respect to the following examples.

*Example 1*

A reaction vessel provided with a rotary stirring device, a thermometer and a dropping funnel was charged with 2800 parts of distilled water and four parts of the sodium salt of sulfonated mahogany acids. In a separate vessel one and one-half parts of potassium persulfate were dissolved in 200 parts of water. The dropping funnel was then charged with a mixture of 900 parts of styrene and 100 parts of thianaphthene-1-dioxide. The reaction was initiated by heating the aqueous medium to opproximately its boiling point and charging one-half of the catalyst solution, and then gradually introducing the mixed monomers. The mixed monomers were added at a constant rate over a period of 30 minutes. At the end of 15 minutes one-half of the uncharged catalyst solution was introduced and the remainder after the reaction had run for a total of 30 minutes. The reaction was thereafter heated for an additional 30 minutes at reflux temperature. After the reaction had been completed the mixture was steam distilled and 220 parts of unreacted monomers were separated. The resulting polymer which was separated by freezing the emulsion, was found to be a useful molding composition having a heat distortion value of 110° C.

*Example 2*

The procedure identical to that described in the preceding experiment was repeated, except that 950 parts of styrene and 50 parts of thianaphthene-1-dioxide was used. The reaction required 1.5 hours and 70 parts of unreacted monomers were collected. The polymer was recovered in the manner described in the preceding experiment and was found to have a heat distortion temperature of 106° C.

Oil bath heat distortion temperatures were measured on polystyrene and each of the compositions of the previous examples. The following table shows the relationship of monomer proportions to the thermostability.

| Styrene | Comonomer | Temperature, ° C. |
|---|---|---|
| 100 | 0 | 98 |
| 95 | 5 | 106 |
| 90 | 10 | 110 |

The invention is defined by the following claims.

We claim:

1. A copolymer of 80 to 99 per cent by weight of styrene and one to 20 per cent of thianaphthene-1-dioxide.

2. A copolymer of 88 to 98 per cent by weight of styrene and two to 12 per cent of thianaphthene-1-dioxide.

3. A method of preparing styrene copolymers which comprises subjecting a mixture of 80 to 99 per cent of styrene and one to 20 per cent of thianaphthene-1-dioxide to an increasing temperature in the presence of a water-soluble peroxy compound.

4. A method of preparing styrene copolymers, which comprises subjecting a mixture of 88 to 98 per cent of styrene and two to 12 per cent of thianaphthene-1-dioxide to an increasing temperature in the presence of a water-soluble peroxy compound.

RICHARD R. MORNER.
DAVID T. MOWRY.

REFERENCES CITED

The following references are of record in the file of this patent:

UNITED STATES PATENTS

| Number | Name | Date |
|---|---|---|
| 2,418,991 | Shokal | Apr. 15, 1947 |
| 2,456,354 | Young | Dec. 14, 1948 |